United States Patent
Staargaard et al.

(10) Patent No.: US 7,449,137 B2
(45) Date of Patent: Nov. 11, 2008

(54) METHOD OF ATTACHING PLASTIC TO A METAL SECTION AND PART MADE THEREBY

(75) Inventors: James E. Staargaard, Farmington Hills, MI (US); Jerry Klanges, Woodstock (CA); Blair Longhouse, Otterville (CA); Eric Kowal, Roseville, MI (US); Larry D. Butterfield, Canton, MI (US); Thomas M. Goral, Oakland Township, MI (US); Mitch Brown, Laingsburg, MI (US); Keith R. Panter, Ann Arbor, MI (US); Terry E. Nardone, Waterford, MI (US); Dennis Gaida, Clarkston, MI (US)

(73) Assignees: General Electric Company, Southfiled, MI (US); Carlisle Engineered Products, Inc., Livonia, MI (US); Vari-Form, Strathroy, Ontario (CA)

( * ) Notice: Subject to any disclaimer, the term of this patent is extended or adjusted under 35 U.S.C. 154(b) by 165 days.

(21) Appl. No.: 11/335,964

(22) Filed: Jan. 20, 2006

(65) Prior Publication Data

US 2006/0121246 A1 Jun. 8, 2006

Related U.S. Application Data

(62) Division of application No. 10/627,910, filed on Jul. 25, 2003.

(60) Provisional application No. 60/434,923, filed on Dec. 19, 2002, provisional application No. 60/398,901, filed on Jul. 25, 2002.

(51) Int. Cl.
*B29C 45/14* (2006.01)

(52) U.S. Cl. .............. 264/267; 264/275; 264/273; 264/274

(58) Field of Classification Search ................ None
See application file for complete search history.

(56) References Cited

U.S. PATENT DOCUMENTS 2,064,435 A * 12/1936 Loeffler ............... 379/433.01
3,470,598 A    10/1969 Berthelsen
3,947,029 A *  3/1976 Gallagher ............... 473/537

(Continued)

FOREIGN PATENT DOCUMENTS

DE        2 750 982        5/1979

(Continued)

OTHER PUBLICATIONS

U.S. Appl. No. 10/627,910, filed Jul. 25, 2003, Office Action mailed Nov. 19, 2007.

(Continued)

*Primary Examiner*—Edmund H. Lee
(74) *Attorney, Agent, or Firm*—Reising Ethington Barnes Kisselle PC

(57) ABSTRACT

The present invention comprises a method of attaching plastic to a metal substrate and a part made by the method. A hydroformed metal section having top and bottom openings is provided. A plastic component is molded about the metal component and through the bottom opening. The plastic component includes a flange on one side thereof to secure the plastic component with the metal component.

6 Claims, 3 Drawing Sheets

U.S. PATENT DOCUMENTS

| | | | | |
|---|---|---|---|---|
| 4,234,638 | A | * | 11/1980 | Yamazoe et al. ............ 428/133 |
| 4,501,052 | A | * | 2/1985 | Mengeringhausen ..... 29/897.34 |
| 4,592,937 | A | | 6/1986 | Nagata et al. |
| 4,683,097 | A | * | 7/1987 | Hand et al. ................. 264/268 |
| 4,764,409 | A | * | 8/1988 | Freeman ...................... 428/98 |
| 4,956,139 | A | * | 9/1990 | Koizumi et al. ............. 264/156 |
| 5,172,920 | A | * | 12/1992 | Schlenk ...................... 277/654 |
| 5,190,803 | A | | 3/1993 | Goldbach et al. |
| 5,219,197 | A | | 6/1993 | Rich et al. |
| 5,634,306 | A | | 6/1997 | Reigelman |
| 5,656,353 | A | * | 8/1997 | Butler ........................ 428/133 |
| 5,672,405 | A | * | 9/1997 | Plank et al. ................. 428/133 |
| 5,842,265 | A | * | 12/1998 | Rink ............................ 29/460 |
| 6,216,810 | B1 | | 4/2001 | Nakai et al. |
| 6,584,950 | B1 | | 7/2003 | Cunningham |
| 6,623,684 | B1 | * | 9/2003 | Satoh et al. ................. 264/267 |
| 6,708,583 | B2 | | 3/2004 | Palmer et al. |
| 6,821,467 | B2 | * | 11/2004 | Wolfe et al. ................. 264/155 |
| 2001/0025462 | A1 | | 10/2001 | Laurent |

FOREIGN PATENT DOCUMENTS

| | | | |
|---|---|---|---|
| DE | 2001 3208 U | | 10/2000 |
| EP | 0976519 | | 2/2000 |
| EP | 1251057 | A2 | 10/2002 |
| EP | 1251057 | A3 | 10/2002 |
| GB | 2 370 803 | | 7/2002 |
| WO | WO 0204276 | | 1/2002 |
| WO | WO 2004011315 | A2 | 2/2004 |

OTHER PUBLICATIONS

PCT Int'l Application No. PCT/US2003/023341 filed Jul. 25, 2003, PCT Publication No. WO 2004/011315 A2, PCT Search Report mailed Jun. 4, 2004.

PCT Int'l Application No. PCT/US2003/023341 filed Jul. 25, 2003, PCT Publication No. WO 2004/011315 A2, PCT Written Opinion mailed Jul. 23, 2004.

PCT Int'l Application No. PCT/US2003/023341 filed Jul. 25, 2003, PCT Publication No. WO 2004/011315 A2, PCT International Preliminary Examination Report mailed Mar. 17, 2005.

EP App. 03771856.6-2307 based on PCT Int'l Application No. PCT/US2003/023341 filed Jul. 25, 2003, PCT Publication No. WO 2004/011315 A2, EP Foreign Search Report mailed Jun. 22, 2007.

* cited by examiner

METHOD OF ATTACHING PLASTIC TO A METAL SECTION AND PART MADE THEREBY

This application claims priority in and benefit of both U.S. applications Ser. Nos. 60/398,901 filed Jul. 25, 2002 and 60/434,923 filed Dec. 19, 2002.

FIELD OF THE INVENTION

The present invention relates to a method of attaching a plastic component to a metal section and to a part made by the method.

BACKGROUND OF THE INVENTION

Currently, structural components for vehicles, such as vehicle front end modules and door supports are made of metal and/or plastic. Front end modules provide structure to the vehicle as well as providing attachment structure for various vehicle components, such as the headlamps, radiator, fan, horn, and the like. Preferably, the front end modules can be provided in a single unit assembly, which is ready to be mounted in the vehicle by the manufacturer.

Commonly, such structural components are made from several stampings that are welded together. Alternatively, such components have been made from closed section metal, such as by extrusion or hydroforming. The use of closed section metal provides a relatively stronger component. Typically, however, additional metal material must be welded to the closed section metal components to provide for attachment surfaces.

These structural components are not currently made entirely from plastic material for larger vehicles because of the inability to meet vehicle performance requirements. However, use of plastic components in conjunction with metal to provide attachment points for the vehicle components is known in the art. In some instances, the metal structural component is attached to the plastic component with mechanical fasteners, such as screws or rivets. But, the use of this method is relatively cost and labor intensive.

Another method of securing the plastic to the metal structure is shown in U.S. Pat. No. 6,273,496 to Guyomard et al and assigned to Valeo Thermique Moteur. This reference discloses front panel that includes metal structural components, including a closed section metal component. A plastic material is overmolded over the metal structure.

Another method of securing plastic to metal is shown in United States Application Publication No. 2001/0053431 to Goldbach et al in the name of Bayer Corporation. Another such plastic and metal part is shown in U.S. Pat. No. 5,919,803 to Goldbach and assigned to Bayer Akhengesellsschaft.

It is desirable to provide a method of attaching a plastic component to a metal component during fabrication without the use of mechanical fasteners while also using a relatively small amount of plastic material to achieve the connection.

SUMMARY OF THE INVENTION

According to the present invention, there is provided a method of attaching a plastic component to a metal component. The method comprises the step of providing a metal component having an opening therein. The metal component is placed in a die. A tool is then positioned on one side of the opening. The plastic component is then molded about at least a portion of the metal component and through the opening such that the plastic component forms a flange on one side of the opening for securing the plastic component with the metal component.

An integral plastic and metal part is also provided. The part comprises a metal component having an opening therein. A plastic component is disposed about at least a portion of the metal component. The plastic material extends through the opening and includes a flange on one side of the opening for securing the plastic component with the metal component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
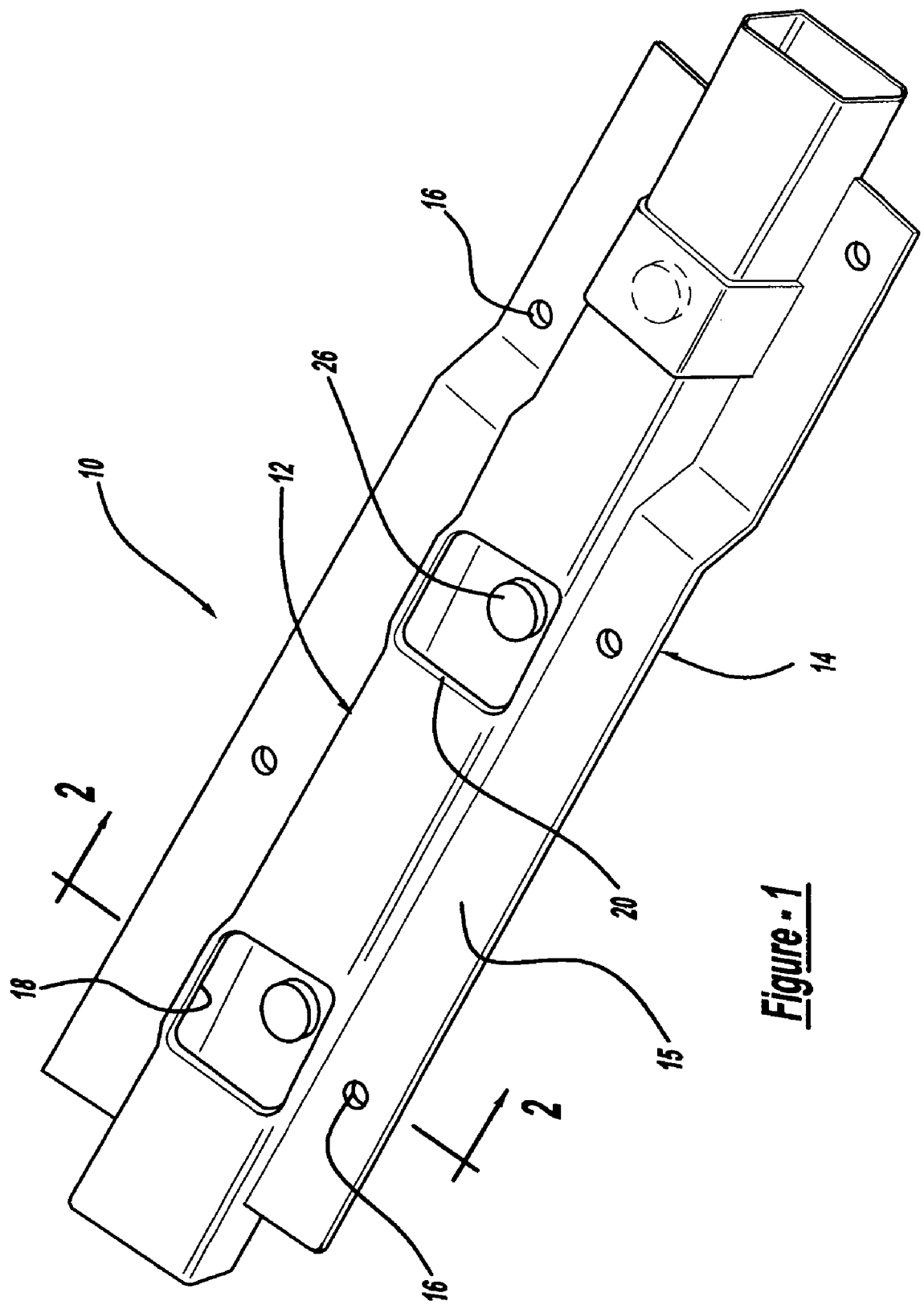
FIG. 1 is a perspective view of a part made in accordance with the present invention.

The following description of the preferred embodiment(s) is merely exemplary in nature and is in no way intended to limit the invention, its application, or uses.

A part made in accordance with the method of the present invention is generally shown at 10 in the Figures. The part 10 includes a metal component, generally indicated at 12, and a plastic component, generally indicated at 14.

Preferably, the metal component 12 comprises a closed cross section. It is preferred that the metal component 12 is formed by hydroforming. The use of such closed cross section metal components provides rigidity to the part 10. Such structures are particularly useful for vehicle support structures. It will be understood that open cross-section metal components may also be used within the scope of the present invention. The metal component 14 may comprise any suitable metal, such as, for example, steel or aluminum.

The metal component 12 is shown to be generally straight or linear. It will be understood that the metal component 12 may also be courved or bent into any desired configuration. Additionally, multiple metal components 12 may be incorporated into a single part 10.

The plastic component 14 is made from any suitable thermoplastic or thermoset material. One such example of a plastic material may comprise polypropylene polyphenelenoxide alloy. While one example of a suitable plastic is provided, it will be appreciated that any suitable thermoplastic or thermoset may be used within the scope of the present invention. Further fillers or other additives may be added to the plastic material to strengthen the plastic component 14. Any suitable filler may be used. Such fillers may comprise, for example, glass fiber or plastic fiber.

The plastic component 14 provides additional strength to the part 10. Further, the plastic component 14 preferably is disposed about at least a portion of the metal component 12 and also can extend outwardly beyond the metal component 12 to provide attachment structure. For example, the plastic component 14 may extend outwardly to provide flanges 15 which may include openings or holes 16 for attaching additional vehicle components to the part 10. The openings 16 may or may not be necessary, and can take any geometric configuration. It will be appreciated that the plastic component may take any desired final configuration. Further a single plastic component 14 may be secured to multiple metal components 12. Similarly, multiple plastic components 14 may be secured to a single metal component 12.

As shown in FIG. 1, the plastic component 14 may also wrap around the metal component 12, such as at 30, although it need not. The plastic component 14 and particularly any flanges 15 can extend outwardly in any manner and in any shape from the metal component 12. In this manner, the plastic component additionally 14 provides an attachment structure to the part 10. That is, the plastic component 14 can include suitable structure for attachment to other components. For example, when the part 10 comprises a front end module, the plastic component 14 may be molded in such a manner to include openings to receive headlamps, cooling system components, hood latch mechanisms, or the like. Further, openings 16 can be included to secure the part 10, for example a front end module, in the vehicle.

Figure 2:
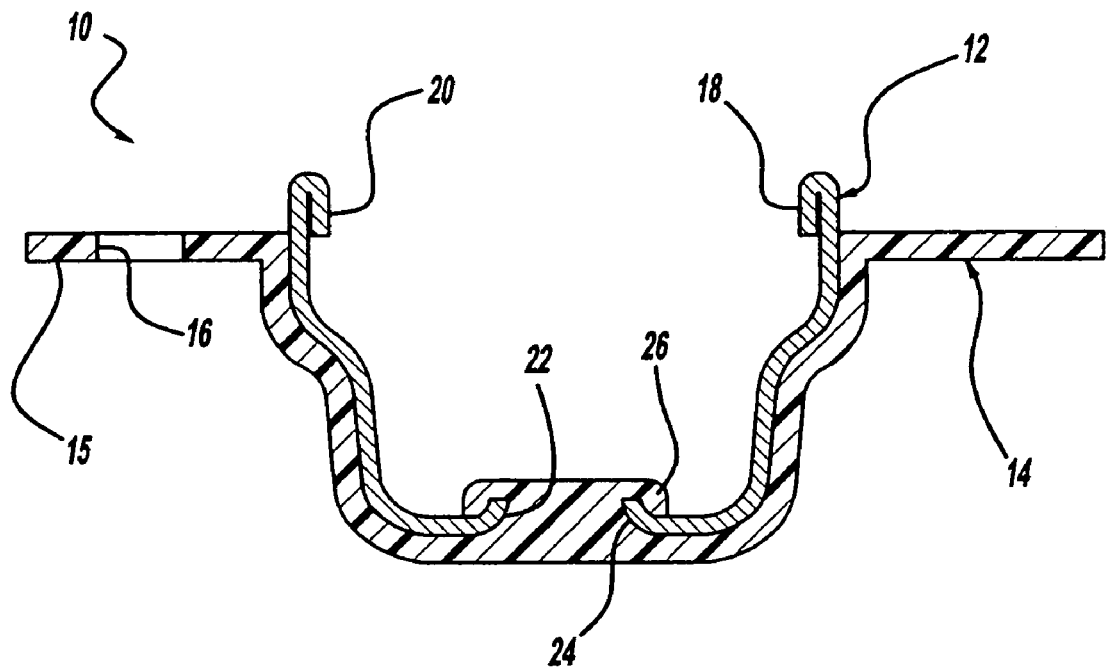
FIG. 2 is a cross sectional view taken along lines 2-2 of FIG. 1.

As best seen in FIG. 2, the metal component 12 includes an upper opening 18. The upper opening 18 allows a tool, such as a core tool to access the interior of the metal component 12 to allow the molding operation as will be described below. It will be appreciated that the opening 18 can be any size that allows a core tool to enter the metal component 12. Edges 20 of the metal component 12 defining the upper opening 18 preferably are folded over to minimize sharp edges in the metal component 12 and to reinforce the metal component 12. A lower opening 22 is also provided. Preferably, the lower opening 22 is circular. As shown, the edges 24 of the lower opening 22 are preferably curved or bent upward, toward the interior of the metal component 12. It will be appreciated that the edges 24 need not be curved or bent.

It will be appreciated that the upper 18 and lower openings 22 can take any configuration. Further, it is preferred that the openings 18 and 22 are placed in the metal component 12 during the hydroforming process. It will also be appreciated that while upper and lower openings are shown on opposite sides of the metal component 12, the openings can be on any surface of the metal component 12 and need not be opposed to one another.

The plastic component 14 preferably is disposed about at least a portion of the metal component 12. Further, the plastic component 14 is disposed through the lower opening 22 in the metal component 12. The plastic component 14 further includes a flange 26. Preferably, the flange 26 is annular and extends beyond edges 24 of the lower opening 22. The flange 26 provides a bottom-like structure. It will be appreciated that the flange 26 need not be annular, provided at least a portion of the flange 26 extends beyond the edges 24 of the lower opening 22. In this manner, the plastic component 14 is secured or locked to the metal component 12. That is, at the lower opening 22, the metal is sandwiched between the flange 26 and the outer portion of the plastic component disposed about the metal component 12. In other words, the flange 26 extends outwardly of the edge 24 of the lower opening 22 on one side of the opening 22 in the metal component 12 and the plastic material of component 14 extends beyond the edge 24 of the lower opening 22 on the opposite side of the opening 22 in the metal component 12.

The curved edges 24 of the lower opening aid in securing the plastic component 14 with the metal component 12. More specifically, the flange 26 extends both outwardly from the lower opening 22 and downwardly to the metal component 12 beyond the upturned edges 24 of the lower opening 22.

As best seen in FIG. 1, the use of the opening 22 allows for multiple attachment points of the plastic component 14 with the metal component 12. Further, this type of connection eliminates the need for mechanical fasteners, such as screw or rivets to secure the plastic 14 and metal components 12. Also, it is not necessary to encapsulate the metal component 12 within the plastic component 14 in order to secure the plastic component 14 to the metal component 12. This connection also allows the formation of the plastic component 14 and securing the plastic component 14 to the metal component 12 to take place in a single molding operation. This creates an integral part 10 having both metal 12 and plastic 14 components.

FIG. 1 specifically shows a series of three of the attachment parts. As viewed from this perspective, two upper openings 18 are shown, and the plastic flange 26 is readily seen covering the lower openings 22. Further, the plastic component 14 emanating from one lower opening is shown. This portion 30 of the plastic component 14 is molded completely about the metal component 12. It will be appreciated that the plastic component 14 on the opposite side includes an opening necessary for the core tool.

In the preferred method of making a part 10 according the present invention, an injection molding process is used. In order to form the part 10, the metal component 12 is first provided. Preferably, the metal component 12 is hydroformed having upper 18 and lower 22 openings. The metal component 12 is placed in a suitable mold cavity. Again, it will be understood that multiple metal components 12 may be placed in a single mold cavity. A core tool is then inserted through the upper opening 18 and is positioned adjacent the lower opening 22. The plastic component 14 is then injection molded from a suitable plastic material. Any openings 16 can be simultaneously molded into the plastic component 14.

The core tool provides two main functions. First it supports the metal component 12 to keep it from collapsing during the molding operation. Further the core tool provides a mold cavity on one side of the opening 22 in the metal component 12 to permit molding of the flange 26 on one side fo the opening 22 of the metal component 12. That is, because the core tool provides a mold cavity, it eliminates the filling of the metal component 12 with plastic material during the molding operation. Similarly, the use of the core tool allows the connection of the plastic component 14 without the need to encapsulate the metal component 12 within the plastic material.

While injection molding is the presently preferred method of making the part 10, it will be appreciated that any other suitable forming technique may be uses within the scope of the present invention. These include: compression molding; injection compression molding, extrusion compress; gas assist or water assist pressure molding, low pressure molding, blow molding, thermoforming or rotational molding.

It will readily be appreciated that parts 10 made in accordance with the present invention can be fabricated to provide vehicle structural components, such as front end modules and door systems. However, the use of the present invention is not so limited. The present invention can be used in any application where a plastic component is secured With a metal component. The present invention is also particularly well suited for use with closed section metal components formed by hydroforming.

Figure 3:
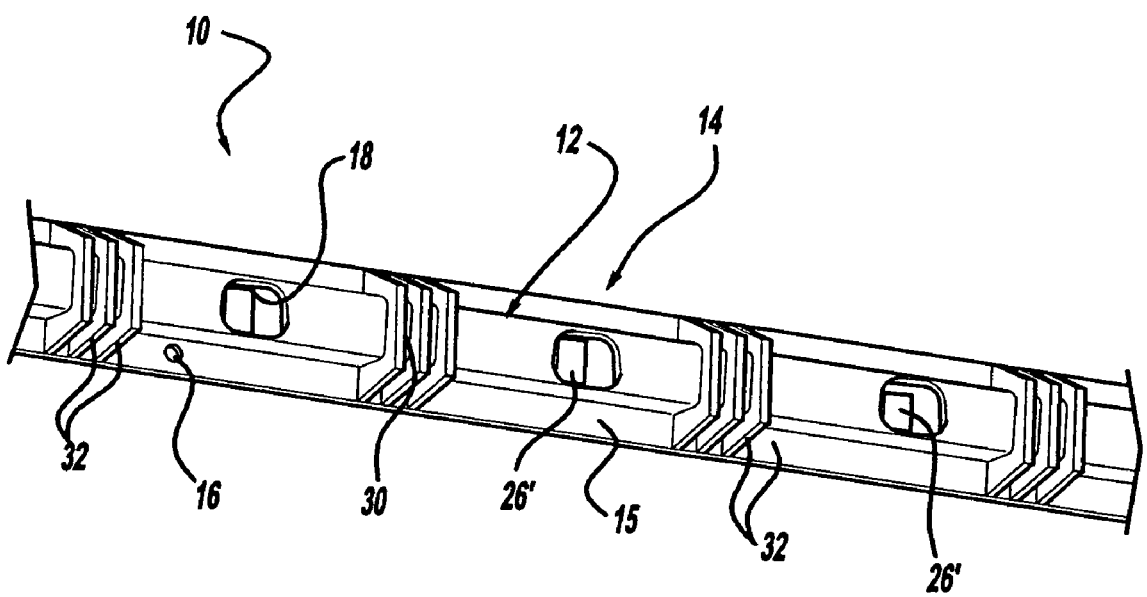
FIG. 3 is a perspective view of an alternate embodiment in accordance with the present invention.

FIG. 3 is a perspective view of an alternate embodiment in accordance with the present invention. In the FIG. 3 embodiment, a metal component 12 and plastic component 14 are provided. The components are similar to those described above with respect to FIGS. 1 and 2. In the FIG. 3 embodiment, strengthening ribs or gussets 32 are added. The ribs 32 provide strengthening to the plastic component 14. These strengthening ribs 32 can be located anywhere on the plastic component 15. Additionally, FIG. 3 shows an alternative flange configuration. The flange 26' shown is generally rectangular. Again, it will be appreciated that, while the flange 26' shown in FIG. 3 is generally rectangular, it can take any suitable configuration.

Figure 4:
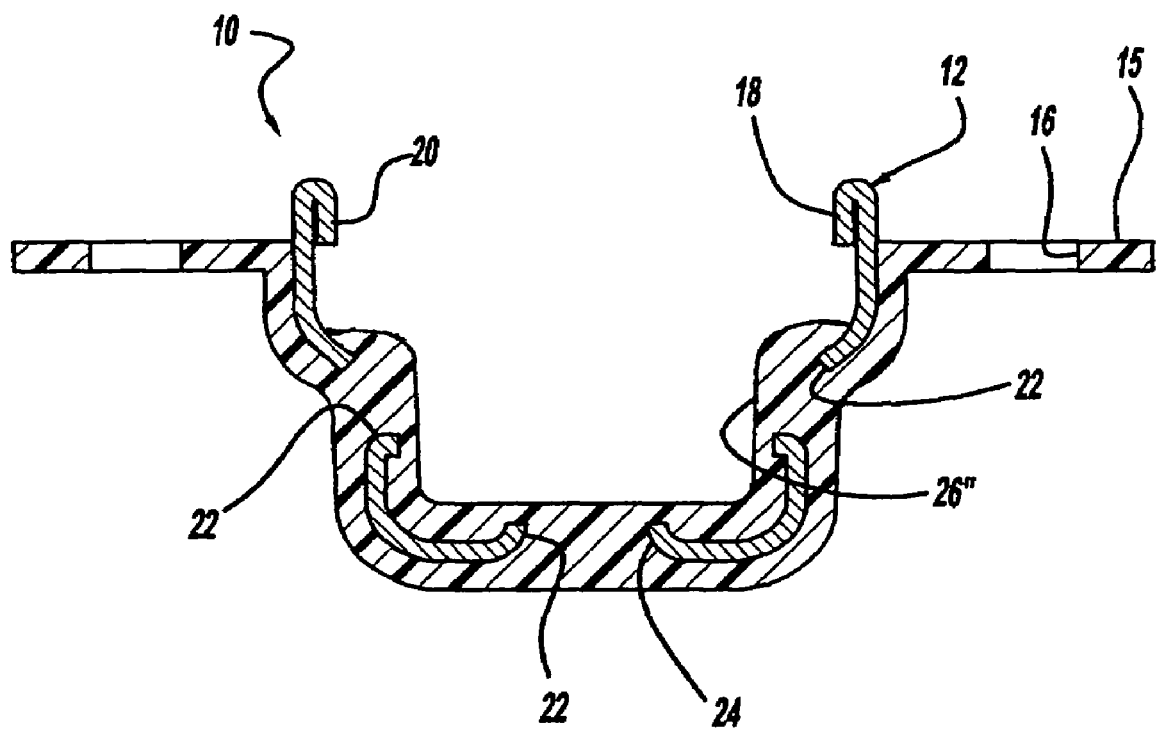
FIG. 4 is a cross sectional view of an alternate embodiment.

FIG. 4 is a cross sectional view of an alternate embodiment. In embodiment of FIG. 4, the lower opening 22 comprises a series of openings 22. The flange 26" extends beyond the edges of each of the openings 22. In this manner, an elongated flange 26" is formed. Preferably, the flange 26" comprises one continuous flange over each opening 22. However, discrete separate flanges could also be used.

As shown in FIG. 4, the series of openings 22 are on different surfaces of the metal component 12. It will be appreciated that the series of openings 22 can be on the same surface of the metal component 12.

Additionally, a rib (not shown) may be added. The rib may interconnect the flange 26". That is, the rib can extend between each of the walls of the metal component 12 shown in cross section in FIG. 4. The rib may be used to add strength to the structure.

The invention has been described in an illustrative manner and it is to be understood that the language used is intended to be in the nature of words of description rather than limitation.

Obviously, many modifications are possible in light of the above teachings. It is, therefore, to be understood that the scope of the invention is defined by the appended claims.

What is claimed is:

1. A method of attaching a plastic component to a metal component comprising the steps of:
   providing a metal component comprising a closed cross section having a first opening therein and a second opening therein;
   placing the metal component in a die;
   inserting a tool through the second opening and positioning the tool on one side of the first opening; and
   molding the plastic component about at least a portion of the metal component and through the first opening, such that plastic component forms a flange on one side of the first opening for securing the plastic component with the metal component.

2. A method as set forth in claim 1 wherein the first opening is defined by an edge and said method further comprises curving the edge.

3. A method as set forth in claim 2 wherein the second opening is defined by a second edge.

4. A method as set forth in claim 3 further comprising bending the second edge of the metal component.

5. A method as set forth in claim 1 further comprising molding ribs into the plastic component.

6. A method as set forth in claim 1 wherein the flange extends beyond the edge of the first opening.

* * * * *